United States Patent [19]
Cahill et al.

[11] Patent Number: 5,044,379
[45] Date of Patent: Sep. 3, 1991

[54] CIGARETTE MANUFACTURE

[75] Inventors: Michael J. Cahill, Coventry; Paul R. Wiese, Milton Keynes, both of England

[73] Assignee: Molins PLC, London, England

[21] Appl. No.: 370,859

[22] Filed: Jun. 23, 1989

[30] Foreign Application Priority Data

Jun. 25, 1988 [GB] United Kingdom ............... 8815175

[51] Int. Cl.$^5$ .......................... A24C 5/00; A24C 5/60
[52] U.S. Cl. .................................. 131/280; 131/28; 131/84.1; 131/910
[58] Field of Search ................. 131/904, 84.1, 280, 131/905, 906, 907, 908, 909, 910, 28

[56] References Cited

U.S. PATENT DOCUMENTS 4,522,214 6/1985 Osmalov ........................... 131/84.1

Primary Examiner—V. Millin
Attorney, Agent, or Firm—Antonelli, Terry, Stout & Kraus

[57] ABSTRACT

In a cigarette making machine, each of a number of quality parameters of the product (individual cigarettes and/or packaged cigarettes) is monitored and a quality value for each parameter is continuously calculated in accordance with predetermined criteira; certain machine operating trends (including causes of stoppages) are monitored; and control devices are automatically operated under the control of a programmable control unit (computer) responsive to all these inputs so as optimize the total of the quality parameters and also the machine operating characteristics.

11 Claims, 1 Drawing Sheet

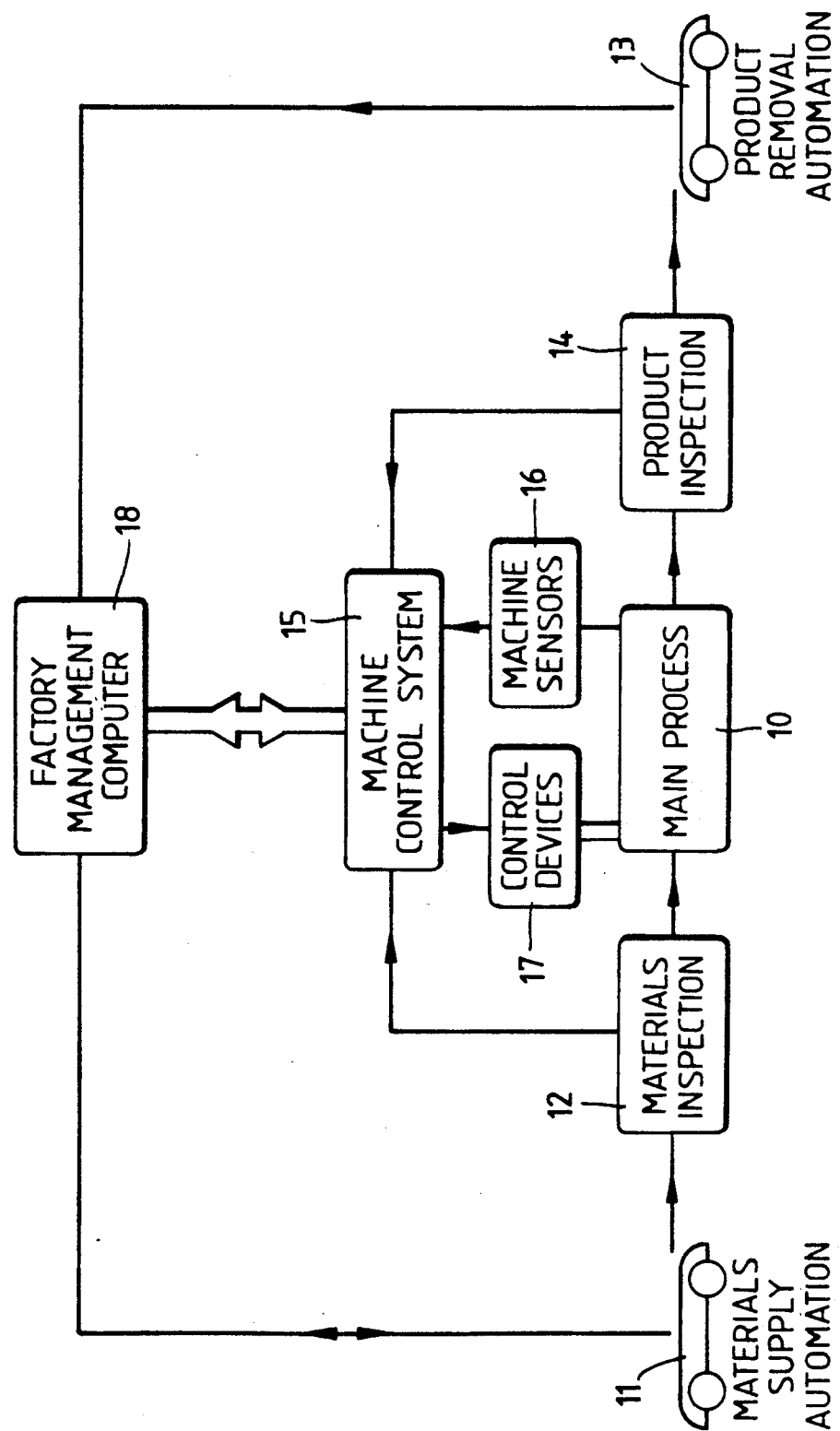

CIGARETTE MANUFACTURE

This invention is concerned primarily with the control of cigarette manufacture to achieve optimum cigarette quality and manufacturing efficiency. Similar principles may be applied to other process machinery, but this invention will for convenience be described with specific reference to cigarette machinery.

Cigarette making machines commonly include various devices for monitoring and/or controlling the manufacturing process and for signalling when the machine needs attention by the operator or maintenance personnel in view of, for example, a drop in quality or the absence of certain materials. There have also been proposals for monitoring trends in the operation of a cigarette making machine and proposals for analysing stoppage reasons to facilitate the provision of appropriate corrective action.

This invention is concerned with more broadly controlling and monitoring the operation of a cigarette making machine with a view to optimising the product quality and the machine efficiency. According to one aspect the present invention, each of a number of quality parameters of the product (individual cigarettes and/or packaged cigarettes) is monitored and a quality value for each parameter is continuously calculated in accordance with predetermined criteria; certain machine operating characteristics (preferably including causes of stoppages) are preferably also monitored; and control devices are automatically operated under the control of a programmable control unit (computer) responsive to all these inputs so as to optimise the total of the quality parameters and preferably also the machine operating characteristics.

Examples of product quality parameters which may be continuously monitored are the following:

Mean rod weight deviation
Individual cigarette weight standard deviation
Mean cigarette diameter
Standard deviation of individual cigarette diameters
Mean moisture
Firmness
Ends fall out (detected for example at the packing machine)
Loose tobacco in packets
Tobacco sieve fraction (based for example on analysis of the tobacco strand lengths of sample cigarettes)
Draw resistance Each of these quality parameters may be allocated points on the basis of weighting their respective importance. For example, relatively high points may be allocated in respect of an important quality parameter in the event that the cigarettes satisfy that parameter, whereas a less important parameter may be arranged to achieve a lower point score in the event that it is achieved satisfactorily.

Alternatively, a zero score for a particular parameter may be regarded as satisfactory, and minus points may be allocated on an appropriate scale for that parameter if the required quality is not reached or not entirely reached.

As an example of a method of allocating positive points, in the case of the mean rod weight deviation a point score of 1.0 may be allocated as long as the mean rod weight does not deviate from the desired weight by more than 10 milligrams. If the deviation is more than 10 milligrams (positively or negatively) but less than 15 milligrams then a point score of 0.5 may be indicated, this being adequate but less than ideal. In the event of a deviation of more than 15 milligrams, the point score may be zero.

Similarly, a point score of 1.0 may be attributed in respect of the mean cigarette diameter as long as the mean diameter does not deviate from the desired figure by more than 0.01 mm. Deviation of more than 0.01 mm but less than 0.02 mm may attract a point score of 0.75. Deviation of between 0.03 and 0.04 mm may attract a point score of 0.50, while deviation greater than 0.04 might attract a zero score.

By continuously computing the point score for each of the quality parameters in question, a total may be achieved which is a measure of overall quality. Corrective action which can be achieved automatically while the machine is in operation may be effected under the control of the computer in order to keep the total point score at or near the optimum possible in the circumstances.

At the same time, machine operating trends or actual instances of stoppages are preferably analysed continuously and adjustments are made through the control devices of the machine so as to automatically minimise the occurrence of such efficiency-dropping events. This however is controlled by the computer so as not to cause a dropping of the total quality below the desired level. For example, machine stoppages caused by chokes in the region of the chimney or garniture might be obviated or reduced by reducing the feed rate of tobacco from the hopper. However, an excessive lowering of the feed rate would adversely affect the mean rod weight deviation and probably also the standard deviation of individual cigarettes which are both important quality parameters. Accordingly, the control computer would be programmed to optimise the machine operation by achieving an appropriate compromise between excessive stoppages caused by chokes and an excessive loss of quality, particularly in respect of the parameters just referred to. This could be achieved by weighting the stoppage causes in generally the way described above with reference to quality parameters.

Some stoppage causes cannot be remedied by the control devices of the machine itself: for example, stoppages caused by the absence or inadequacy of materials supplied to the machine. Examples of stoppage causes which can or may be remedied by controlling the operation of the machine itself, though subject to compromise so as not to affect quality excessively, are the following:

Chimney choke—remedied by changing fibre length distribution and/or by changing the hopper speed to alter the feed rate.
Rail choke (or chimney choke)—adjust tobacco temperature and/or moisture.
Paper break—paper tension is reduced.
Lap seal failure—control adhesive flow.

BRIEF AND DETAILED DESCRIPTION OF DRAWING

The attached figure shows schematically a cigarette manufacturing system based upon this invention. It shows specifically one cigarette making machine 10 (or other analogous process machine) which is fed with materials from the left and delivers finished products to the right. Materials in the case of a cigarette making machine may be fed automatically from a remote location (e.g. in the case of tobacco or paper) or may be fed from a materials supply station serving a number of machines and having materials supplied to it in various ways including, possibly, automatically guided vehicles as shown diagrammatically at 11. Materials pass to the making machine via a materials inspection station 12. The finished products may be removed by any suitable means 13 after inspection at a product inspection station 14. An individual machine controller 15 receives signals from the materials inspection station 12 and product inspection station 14 and also from machine sensors shown diagrammatically at 16. The controller 15 produces output signals to machine control devices shown diagrammatically at 17. The controller 15 also reports and receives control signals to and from a factory management computer 18 which may also be capable of responding directly to materials and product information and may be capable of controlling the product, for example through control of parts of the primary tobacco process such as the cutting and drying of tobacco.

An example of control of materials is a follows. In the preparation of tobacco for delivery to the making machine, various operations occur in the primary plant in a cigarette factory which affect characteristics of the tobacco such as the distribution of longer, medium length and shorter tobacco fibres. For any given blend of tobacco there may be an optimal fibre length distribution for achieving desired quality parameters of the finished cigarettes and also desired machine efficiencies. For example, an excessive proportion of short tobacco may adversely affect the product quality whereas excessive long strands may adversely affect the efficiency of operation of the machines by causing more frequent chokes. Accordingly the factory computer 18 may be capable of controlling the primary process in response to data received from the machine controller 15 so as to assist in optimising the quality/efficiency parameters. Alternatively, or in addition, the tobacco fibre length distribution may be controlled (while optimising its effect on product quality and machine efficiency) by a device within the cigarette making machine itself. An example of such a device is described in our British patent application No. 8902932 (U.S. application Ser. No. 308513, filed 10 Feb. 1989).

Cigarette firmness is one of the examples of quality parameters mentioned above. It is important as it is susceptible to immediate evaluation by the smoker, especially as he is able to feel noticeably soft parts of a cigarette which are suggestive of an inadequate tobacco filling. A number of devices have been proposed for measuring rod firmness on-line (as opposed to laboratory-type devices for sample testing), some examples being disclosed in our U.S. Pat. No. 3633590.

An alternative way of obtaining an indication of firmness consists of monitoring the mean height of the trimmer (which is controlled to maintain the rod weight or density substantially constant). The height signal is indicative of firmness in that the greater the vertical dimension of the tobacco stream after trimming, the greater will be the firmness. A better estimate of firmness of the finished cigarette can be obtained by taking into account, mainly through empirical determination, the actual rod weight, the rod diameter and the tobacco moisture content and temperature.

We claim:

1. A method of manufacturing cigarettes in which each of a number of quality parameters of the product is monitored and a quality value for each parameter is continuously calculated in accordance with predetermined criteria; control devices are automatically operated under the control of a programmable control unit so as to optimise the total of the quality parameters; and in which the machine operating characteristics which are monitored include stoppage causes.

2. A method of manufacturing cigarettes in which each of a number of quality parameters of the product is monitored and a quality value for each parameter is continuously calculated in accordance with predetermined criteria; control devices are automatically operated under the control of a programmable control unit so as to optimise the total of the quality parameters; and in which the various operating characteristics are weighted according to a point score system whereby control of the machine is achieved taking into account the different degrees of significance of different characteristics.

3. A method of operating process machinery in which each of a number of quality parameters of the product is monitored and a quality value for each parameter is continuously calculated in accordance with predetermined criteria; certain machine operating characteristics, including causes of stoppage, are monitored; and control devices are automatically operated under the control of a programmable control unit responsive to all these inputs so as to optimise the total of the quality parameters and also the machine operating characteristics.

4. Apparatus for manufacturing cigarettes including means for monitoring each of a number of quality parameters of the product and for computing a quality value for each parameter in accordance with predetermined criteria: means for monitoring certain machine operating trends, including causes of stoppage; and control devices arranged automatically to operate under the control of a programmable control unit responsive to all these inputs so as to optimise the total of the quality parameters and also the machine operating characteristics.

5. A method of manufacturing cigarettes in which a plurality of quality parameters of the cigarettes are monitored and a quality value for each parameter is continuously calculated in accordance with predetermined criteria, and control devices are automatically operated under the control of a programmable control unit responsive to all these inputs so as to optimise the total of the quality values of the quality parameters, which parameters comprise a plurality of parameters selected from the group including mean rod weight deviation, individual cigarette weight standard deviation, mean cigarette diameter, standard deviation of individual cigarette diameters, firmness, tobacco ends fall-out, and cigarette draw resistance.

6. A method according to claim 5 in which cigarette quality is optimised by allocating achievable points to various of the quality parameters and by continuously or regularly assessing the actually achieved quality with respect to each of the parameters, and controlling one or more control devices affecting cigarette manufacture so as to achieve an optimal total point score at substantially all times.;

7. A method according to claim 5 in which machine operating characteristics are monitored and are optimised by controlling at least one of the control devices while minimising, to the extent possible, a significant adverse effect on the quality point score.

8. A method of manufacturing cigarettes using a machine controlled by a plurality of control devices operated by a programmable control unit, comprising the steps of:

monitoring a plurality of quality parameters of the cigarettes as they are produced, including at least one of mean rod weight deviation, individual cigarette weight standard deviation, mean cigarette diameter, standard deviation of individual cigarette diameters, firmness, tobacco ends fall-out, and cigarette draw resistance;

continuously calculating a quality value for each quality parameter being monitored in accordance with predetermined criteria; and automatically operating said control devices under control of said programmable control unit so as to optimise the total of the quality values of said quality parameters being monitored.

9. A method according to claim 8, wherein the quality value of each parameter is calculated by allocating maximum values of achievable points to respective quality parameters on the basis of a relative value of the respective quality parameter in the overall quality of the cigarette and its manufacture, assessing the actually achieved quality of each quality parameter, and awarding points within the range of achievable points for each quality parameter based on the assessed actually achieved quality thereof.

10. A method according to claim 9, in which cigarette quality is optimised by regularly totalling the points awarded each quality parameter and controlling said control devices to provide a maximum total of points at all times.

11. A method according to claim 8, further including monitoring machine operating characteristics, including stoppage causes, and operating said control devices so as to optimise said machine operating characteristics while minimising the effect of such operation on the quality values of each quality parameter.

* * * * *